(12) United States Patent
Hayden et al.

(10) Patent No.: US 6,853,659 B2
(45) Date of Patent: Feb. 8, 2005

(54) LASER SYSTEM UTILIZING HIGHLY DOPED LASER GLASS

(75) Inventors: Joseph Hayden, Clarks Summit, PA (US); Sally Pucilowski, Luzerne, PA (US); Bianca Schreder, Frankfurt (DE); Ulrich Peuchert, Bodenheim (DE); Ruediger Sprengard, Mainz (DE); Martin Letz, Klein-Winterheim (DE)

(73) Assignee: Schott Glass Technologies, Inc., Duryea, PA (US)

( * ) Notice: Subject to any disclaimer, the term of this patent is extended or adjusted under 35 U.S.C. 154(b) by 0 days.

(21) Appl. No.: 10/229,279

(22) Filed: Aug. 28, 2002

(65) Prior Publication Data

US 2004/0042515 A1 Mar. 4, 2004

(51) Int. Cl.[7] .............................................. H01S 3/98
(52) U.S. Cl. .............................. 372/39; 372/18; 372/25; 372/40
(58) Field of Search ....................... 372/39, 18; 501/48, 501/73

(56) References Cited

U.S. PATENT DOCUMENTS

| | | |
|---|---|---|
| 3,979,322 A | 9/1976 | Alexeev et al. |
| 4,022,707 A | 5/1977 | Deutschbein et al. |
| 4,075,120 A | 2/1978 | Myers et al. |
| 4,076,541 A | 2/1978 | Rapp |
| 4,108,673 A | 8/1978 | Toratani et al. |
| 4,239,645 A | 12/1980 | Izumitani et al. |
| 4,248,732 A | 2/1981 | Myers et al. |
| 4,333,848 A | 6/1982 | Myers et al. |
| 4,371,965 A | 2/1983 | Lempicki et al. |
| 4,470,922 A | 9/1984 | Denker et al. |
| 4,661,284 A | 4/1987 | Cook et al. |
| 4,770,811 A | 9/1988 | Myers |
| 4,820,662 A * | 4/1989 | Izumitani et al. .............. 501/73 |
| 4,929,387 A * | 5/1990 | Hayden et al. ....... 252/301.4 P |
| 4,962,067 A * | 10/1990 | Myers .......................... 501/45 |
| 5,032,315 A | 7/1991 | Hayden et al. |
| 5,053,165 A | 10/1991 | Toratani et al. |
| 5,164,343 A | 11/1992 | Myers |
| 5,173,456 A | 12/1992 | Hayden et al. |
| 5,322,820 A | 6/1994 | Myers et al. |
| 5,334,559 A * | 8/1994 | Hayden ........................ 501/48 |
| 5,526,369 A | 6/1996 | Hayden et al. |
| 5,607,886 A * | 3/1997 | Onozawa ...................... 501/73 |
| 5,663,972 A * | 9/1997 | Payne et al. .................. 372/18 |

OTHER PUBLICATIONS

Physics of Laser Fusion, vol. IV, The Future Development of High–Power Solid State Laser Systems, J.L. Emmett et al., Nov. 1982.

* cited by examiner

Primary Examiner—Don Wong
Assistant Examiner—Dung Nguyen
(74) Attorney, Agent, or Firm—Millen, White, Zelano & Brantigan, P.C.

(57) ABSTRACT

A laser uses a rare-earth doped phosphate laser glass characterized by a particularly high rare-earth content to generate the highest possible output power/energy pulses. The laser glass is composed primarily of $P_2O_5$, $Al_2O_3$, and alkaline earth and alkali earth oxides, and possesses other properties such as physical and thermal properties that are compatible with melting and manufacturing methods. The laser glass can be used in high power and high energy laser systems where laser action is achieved in rod or slab shaped components as well as in waveguide or thin film structures prepared by structuring technologies such as sputtering, ion exchange, and/or direct writing with a femtosecond laser.

15 Claims, 5 Drawing Sheets

LASER SYSTEM UTILIZING HIGHLY DOPED LASER GLASS

BACKGROUND OF THE INVENTION

1. Field of the Invention

The invention relates to rare-earth doped phosphate laser glasses and methods of generating pulses of laser light in a laser system using such laser glasses.

2. Background of the Invention

It was first recognized that neodymium (Nd) doped laser glass could serve as a lasering material or gain medium over forty years ago (E. Snitzer, "Optical Maser Action in Barium Crown Glass," Physical Review Letters 7, 444 (1961)). The Nd-doped glass is energized with a pump source, such as a flashlamp of other laser components such as laser diodes, so that the material exhibits gain near the lasing wavelength. For example, in the case of Nd-doped barium crown glass the lasing wavelength is 1054 nm. In this way, it is possible to amplify or generate laser light within the gain medium, i.e., the laser glass.

Following the recognition that Nd-doped glass was a useful gain medium, there were numerous developments in the area of laser glass in which particular formulations and compositions were developed with properties specifically tailored to match individual applications. Phosphate glasses were one area that received particular attention from the scientific community. The first Nd-doped phosphate laser glass patents focused solely on the composition of the glass material itself (DePaolis et al., U.S. Pat. No. 3,250,721). Later, Deutschbein et al. disclosed Nd-doped phosphate laser glass compositions having low thermal expansion and negative temperature coefficient of refractive index (dn/dT) making possible the design of solid-state laser systems with optical pathlength nearly independent of changes in device temperature (see U.S. Pat. No. 4,022,707).

Alexeev et al., in U.S. Pat. No. 3,979,322, combined the use of negative dn/dT values along with higher values for stimulated emission of laser light ($\sigma_{emm}$), and claimed more limited phosphate glass compositions specific for Nd-lasers. Later patents disclosed Nd-doped laser glass compositions that provide for: reduced glass transition temperature, the temperature at which glass properties such as refractive index are subsequently influenced by exposure to high temperature (U.S. Pat. No. 4,996,172 by Beall et al.); improved thermal shock resistance (e.g., high fracture toughness) in combination with good laser properties (U.S. Pat. No. 4,929,387 by Hayden et al., U.S. Pat. No. 5,053,165 by Toratani et al., and U.S. Pat. No. 5,032,315 of Hayden et al.); chemical strengthening techniques (U.S. Pat. No. 5,164,343 by Myers); a desirable athermal behavior (U.S. Pat. No. 4,075,120 and U.S. Pat. Nos. 4,333,848 by Myers et al. and 4,108,673 by Izumitani et al.); sensitized laser glasses (U.S. Pat. No. 4,770,811 by Myers); glasses with reduced concentration quenching behavior (U.S. Pat. No. 4,371,965 by Limpicki et al., U.S. Pat. No. 4,470,922 by Denker et al., and U.S. Pat. No. 4,661,284 by Cook et al.); glasses characterized by low values of emission cross section $\sigma_{emm}$ (U.S. Pat. No. 5,173,456 by Hayden et al.); and glasses with properties enhanced for manufacturing yield in combination with improved performance in high peak energy laser systems (U.S. Pat. No. 5,526,369 by Hayden et al.). In addition, U.S. Pat. No. 4,820,662 by Izumitani et al., discloses phosphate glass compositions that contain $SiO_2$ as a required additive which also contain rare-earths (specifically neodymium) up to 12 mol % on an oxide basis. The aforementioned patents are cases where rare-earth-doped, in particular neodymium-doped, glass compositions were tailored to offer properties favorable for specific laser application examples.

SUMMARY OF THE INVENTION

The current invention relates to the use of a particular type of rare-earth containing glass in a laser system to generate or amplify laser light where the high rare-earth contents are utilized.

Accordingly, an object of the invention is to provide improved laser systems that employ highly doped rare-earth phosphate laser glasses as the active material.

A further object of the invention is to provide improved laser systems that employ a phosphate glass composed primarily of $P_2O_5$, $Al_2O_3$, alkali earth oxides, and alkaline earth oxides, that contains high concentrations of rare earth ions and possesses other properties such as physical and thermal properties that are compatible with melting and manufacturing methods.

A further object of the invention is to provide improved laser systems in which a highly doped rare earth containing phosphate laser glass, in the form of rod or slab shaped component or in waveguide or film structures prepared by structuring technologies such as ion exchange and femto-second laser writing and/or by sputtering, is employed as the active material.

Upon further study of the specification and appended claims, further objects and advantages of this invention will become apparent to those skilled in the art.

The present invention entails the means of generating or amplifying laser light pulses by utilizing a highly doped rare earth containing phosphate glass as the preferred gain medium. The invention involves the recognition that certain levels of rare earth content, higher than those used in the prior art, are desirable in certain laser system designs. Such levels were thought to be previously prohibitive, either because of manufacturing difficulties associated with solubility issues of rare earth materials in glass or because of decreased laser performance due to issues of self quenching of rare earth excited states involved in the laser transition when rare earth concentration levels achieve a critical value, called concentration quenching. See, e.g. U.S. Pat. No. 4,239,645 which discloses that high $Nd_2O_3$-contents cause difficulties in oscillating and amplifying the laser glass due to quenching.

DETAILED DESCRIPTION OF THE INVENTION

Figure 1:
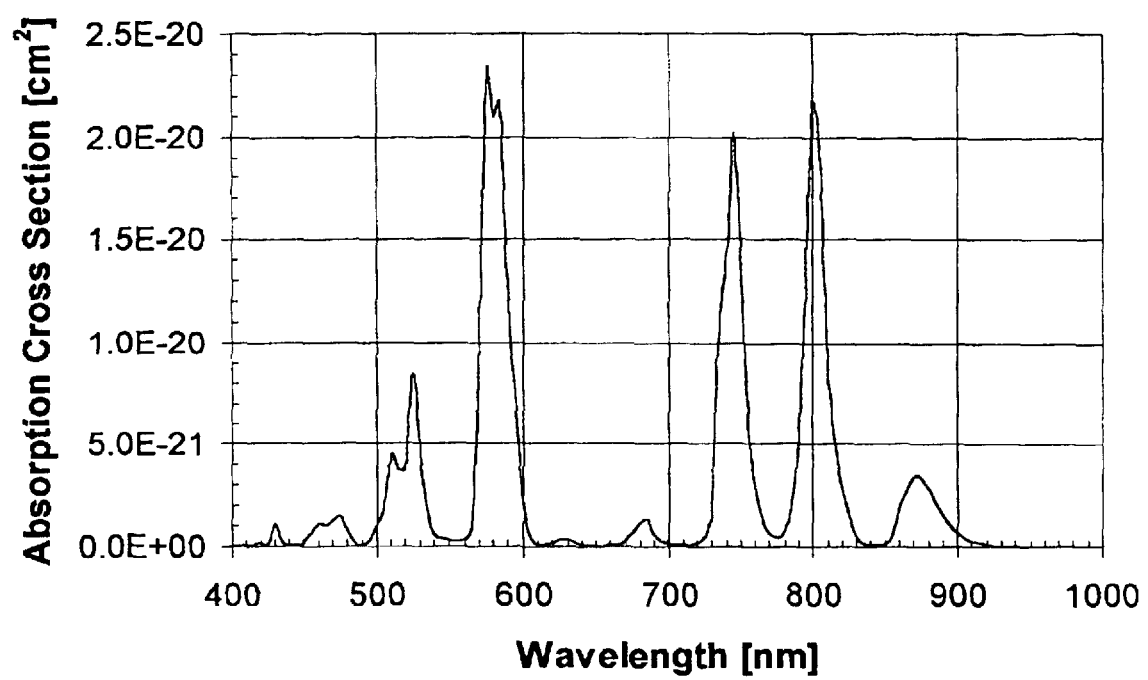
FIG. 1 shows the absorption cross section spectrum of a highly doped phosphate glass, containing neodymium, at room temperature.

Laser glasses of the present invention comprise $P_2O_5$, $Al_2O_3$, alkali earth oxides, and alkaline earth oxides.

Preferably, the glass contains a maximum of 4 weight percent, especially a maximum of 2 weight percent, of conventional additives or impurities, such as refining agents (e.g., $As_2O_3$), antisolarants (e.g., $Nb_2O_5$) and $SiO_2$ which can enter the glass through dissolution of the melting vessel. The inventive glasses are doped with lanthanide oxides (oxides of elements 57–71) or rare earth oxides (lanthanide oxides and oxides of Sc and Y) in an amount exceeding 8 mol %, preferably exceeding 12 mol %. Exemplary lanthanide/rare earth oxides are $La_2O_3$, $Ce_2O_3$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$. The laser glasses according to the invention are highly doped with preferably neodymium, ytterbium and/or erbium. In the glasses, the oxygen in the metal oxides can optionally be replaced by fluorine up to 90%.

In general, the glasses have a $P_2O_5$ content of 50 to 75 mol %, for example, 51, 52, 53, 54, 55, 56, 57, 58, 59, 60, 61, 62, 63, 64, 65, 66, 67, 68, 69, 70, 71, 72, 73, 74 mol %. Further preference is given to glasses having a $P_2O_5$ content above 60 mol %, more preferably above 65 mol %, even more preferably above 70 mol %, and especially preferably above 71 mol %.

In addition, in general, the glasses have a $Al_2O_3$ content of 3 to 15 mol %, for example, 4, 5, 6, 7, 8, 9, 10, 11, 12, 13, 14 mol %. Preference is given to glasses having an $Al_2O_3$ content above 5 mol %, more preferably above 8 mol %, and even more preferably over 10 mol %, and particularly more preferably over 12 mol %.

The alkali metal oxides used in the inventive glasses are $Na_2O$, $K_2O$, $Li_2O$, $Rb_2O$ and $Cs_2O$, preferably $Na_2O$, $Li_2O$, $K_2O$ and $Cs_2O$, and especially $Li_2O$, $K_2O$ and $Na_2O$. The amount of combined alkali metal oxides is, for example, 2.5 to 35 mol %, for example, 3, 4, 5, 6, 7, 8, 9, 10, 11, 12, 12, 13, 14, 15, 16, 17, 18, 19, 20, 21, 22, 23, 24, 25, 26, 27, 28, 29, 30, 31, 32, 33, 34 mol %, preferably 5 to 30 mol %.

The alkaline metal oxide used in the inventive glasses are MgO, CaO, SrO and BaO. However, ZnO can be used interchangeably for these alkaline metal oxides. Preferably MgO, BaO and ZnO are the employed metal oxides at levels of, for example, 0 to 35 mol %, for example, 0.5, 1, 1.5, 2, 3, 4, 5, 6, 7, 8, 9, 10, 11, 12, 12, 13, 14, 15, 16, 17, 18, 19, 20, 21, 22, 23, 24, 25, 26, 27, 28, 29, 30, 31, 32, 33, 34 mol %, preferably 0 to 30 mol %, especially 5 to 30 mol %.

In accordance with one embodiment, the glasses contain $Nd_2O_3$ in an amount of more than 8 mol %, for example, 9, 10, 11, 12, 13, 14, 15, 16, 17, 18, 19, 20, 21, 22, 23, 24, 25, 26, 27, 28, 29, 30 mol %, etc., preferably more than 12 mol %. In accordance with another embodiment, the glasses have a combined ytterbium and erbium content in an amount exceeding 8 mol %, for example, 9, 10, 11, 12, 13, 14, 15, 16, 17, 18, 19, 20, 21, 22, 23, 24, 25, 26, 27, 28, 29, 30 mol %, etc., preferably exceeding 12 mol %. Preference is given to glasses doped with erbium in an amount exceeding 0.15 mol %, for example, 0.20, 0.25, 0.30, 0.40, 0.45, 0.50, 0.55, 0.60, 0.65, 0.70, 0.75 mol %, etc.

Laser glasses of the present invention can also contain refining agents, such as $As_2O_3$, and $Sb_2O_3$, and antisolarant additives, such as $Nb_2O_5$, as well as small levels of additional components, such as $SiO_2$, that are present in the glass from dissolution of the melting equipment used to manufacture the glass. The combined levels of these other additives normally do not exceed 4 percent on a weight basis.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

Examples of the highly doped rare earth containing phosphate laser glass of the present invention are disclosed in Table 1.

TABLE 1

Examples of highly doped rare earth containing phosphate laser glasses, glass compositions are expressed on a mol percent oxide basis.

| Oxide | Example 1 | Example 2 |
|---|---|---|
| $P_2O_5$ | 58.34 | 61.47 |
| $Al_2O_3$ | 7.43 | 7.83 |
| $K_2O$ | 18.84 | 19.85 |
| MgO | 6.27 | 6.60 |
| $As_2O_3$ | 0.10 | 0.10 |
| $Nb_2O_5$ | 0.10 | 0.10 |
| $Nd_2O_3$ | — | 4.05 |
| $Yb_2O_3$ | 8.16 | — |
| $Er_2O_3$ | 0.76 | — |

Properties of the glasses in Table 1 are detailed in Table 2.

TABLE 2

Properties of the highly doped rare earth containing phosphate laser glasses in Table 1.

| Property | Example 1 | Example 2 |
|---|---|---|
| Index at 587.6 nm | 1.527 | 1.519 |
| Dispersion | 65.53 | 63.86 |
| Absorption at 3000 $cm^{-1}$ [$cm^{-1}$] | 0.723 | 0.527 |
| Density [$gm/cm^3$] | 3.03 | 2.69 |
| Transformation Temperature [° C.] | 525 | N.A. |
| Thermal Expansion 20–300° C. [$\times 10^{-7}$/K] | 102.9 | N.A. |

Figure 3:
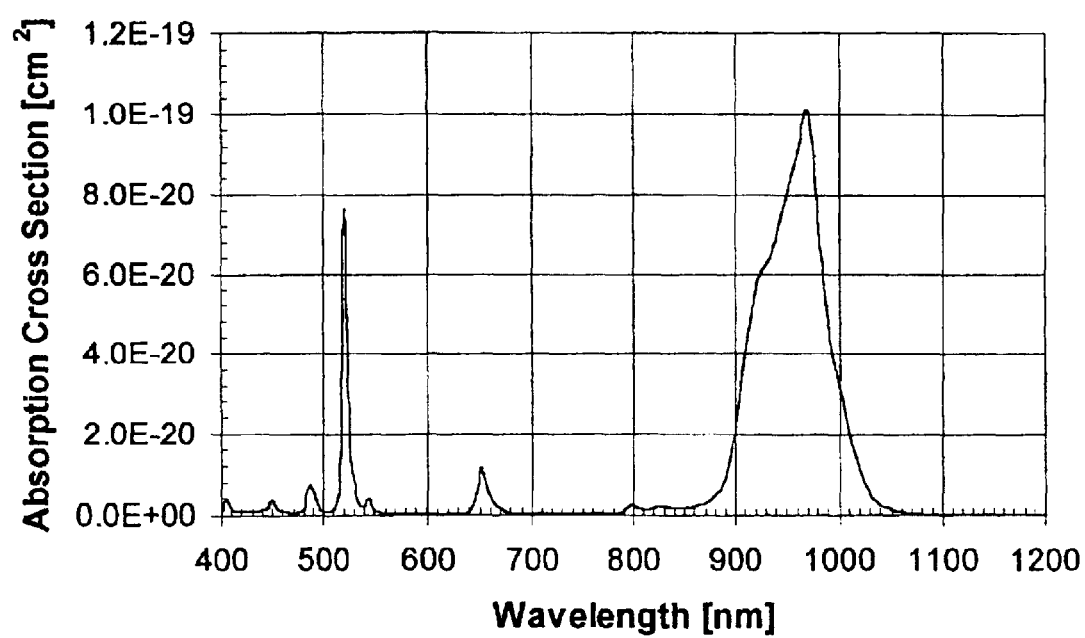
FIG. 3 shows the absorption cross section spectrum of a highly doped phosphate glass, containing erbium and ytterbium, at room temperature.

The absorption spectrum of the neodymium, erbium, and/or ytterbium containing phosphate glasses (hereafter referred to as "HDG-1") pictured in FIG. 1 and FIG. 3 provides guidance in regards to the appropriate means by which to energize, or pump, the laser glass. In the case of neodymium, the dopant ions give rise to numerous absorption bands throughout the infrared-visible-ultraviolet region whereas, in the case of the ytterbium/erbium, the dopant ions give rise to two prominent absorption bands. See FIGS. 1 and 3. These laser glasses can be pumped by white light generating flash lamps. In addition, monochromatic light sources may be utilized as pump sources when output wavelengths of these devices correspond to absorption bands for rare earth ions in the phosphate glass. Examples include qdiode lasers at 801 or 808 nm, argon-ion lasers at 514 nm, and dye lasers operating at 580 nm for neodymium-doped glasses, and similar devices for erbium/ytterbium-doped glasses such as diode lasers operating at 980 nm and Ti:Sapphire lasers at 977 nm. As a consequence of rapid internal relaxation processes, light energy absorbed by any of these pump laser systems lead to the same luminescence features from the rare earth doped glass.

The main luminescence band employed in neodymium doped laser systems is the well-known band at 1054 nm. In the case of ytterbium, the emission is centered near 1.02 μm and in the case of erbium the fluorescence emission is centered near 1.54 μm. The fluorescence lifetime of these features is known to be a strong function of the doping concentration. This is exemplified in FIG. 2, using neodymium as an example. The lifetime, $\tau_{emm}$, decreases with increasing neodymium content, $N_{Nd}$, often with a functional form of:

$$\tau_{emm}=\tau_o[1-N_{Nd}/q]$$

where $\tau_o$ and q are fitting parameters that are typically arrived at by mathematical fitting of actual measured fluorescence lifetime values, $\tau_{emm}$, for various neodymium concentrations in the glass, $N_{Nd}$. As can be seen in the above fitting formula, as well as in FIG. 2, increasing neodymium content has a detrimental impact on the excited state lifetime, leading to reduced energy storage in highly doped glasses.

Figure 2:
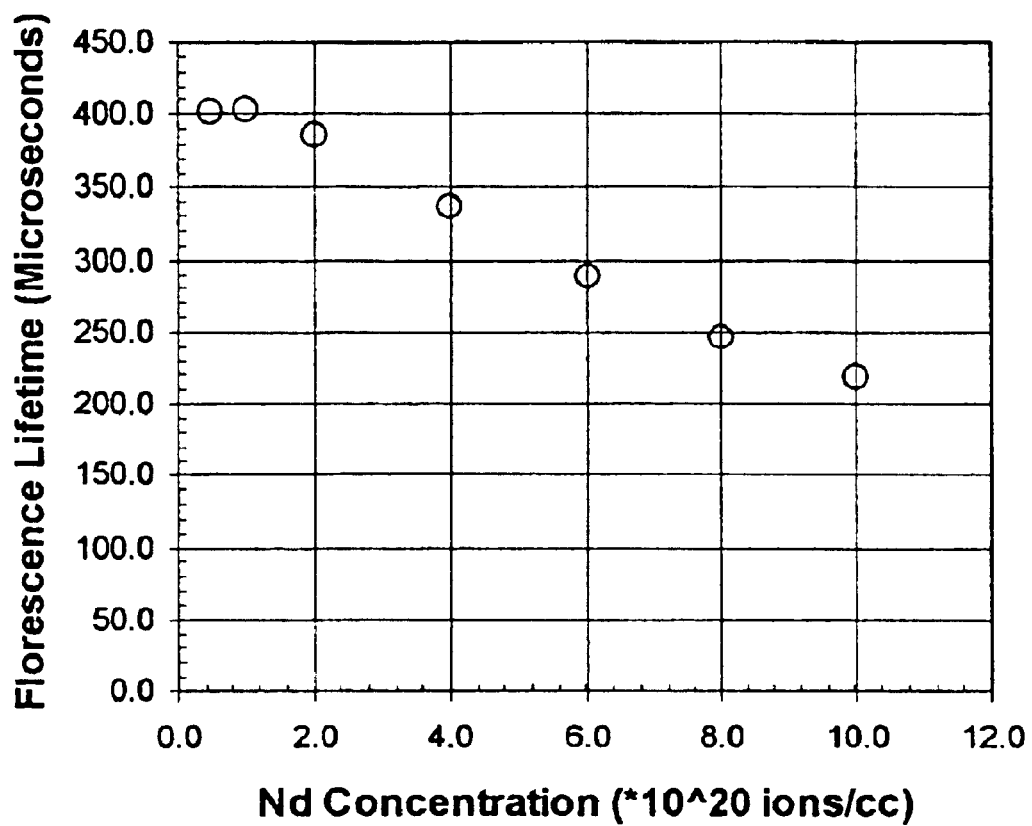
FIG. 2 shows the decrease in exited state fluorescence lifetime for neodymium doped phosphate glass at room temperature.

The data in FIG. 2 suggests that high rare earth containing glasses would not be desirable in laser systems. However, certain laser designs can in fact take advantage of such high doping levels without seriously compromising laser operation performance because other advantages are created that offset any disadvantage of the shorter fluorescence lifetime. An example is the small device footprint possible when highly doped glass is used to achieve the same total number of rare earth ions as would be available from a larger glass part prepared with a lower doping level.

Figure 4:
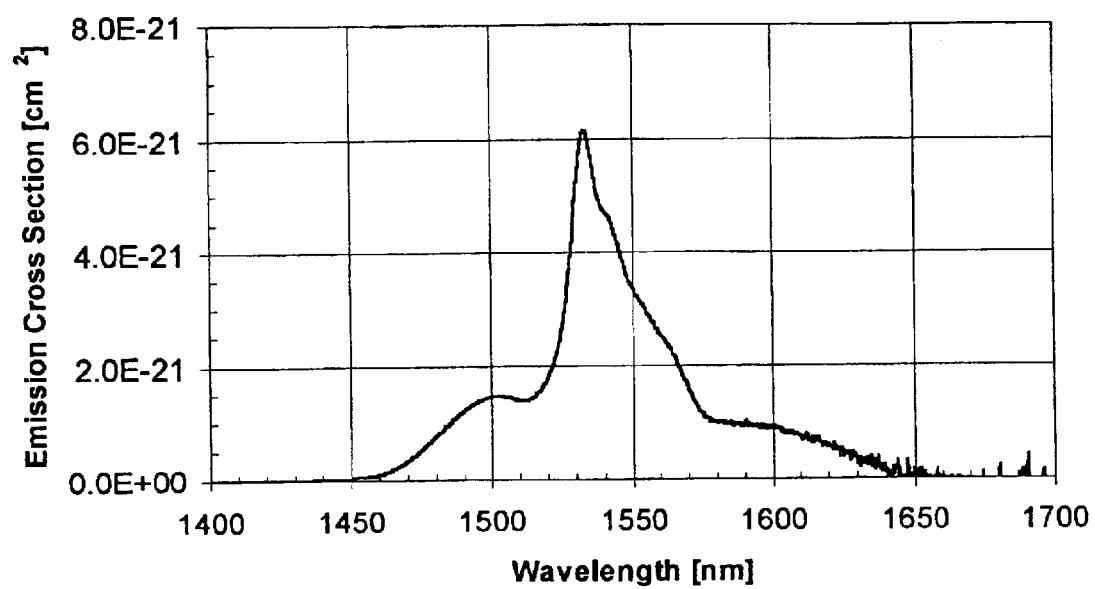
FIG. 4 shows the calculated emission cross section spectrum of a highly doped phosphate glass, containing erbium, at room temperature.

FIG. 4 depicts the emission cross section for erbium in the highly doped erbium and ytterbium containing phosphate glass with the absorption spectrum shown in FIG. 3. The calculation of emission cross section was completed by employing the McCumber theory (D. E. McCumber, Phys. Rev. 134, A299 (1964)). The McCumber theory provides a path to estimate emission cross section, $\sigma_e$, as a function of wavelength from measurements of absorption cross section, $\sigma_a$, by:

$$\sigma_e(\nu)=\sigma_a(\nu)\exp[(\epsilon-h\nu)/kT]$$

where ν is the frequency of interest (=c/λ where c is the speed of light in vacuum and λ is the wavelength of interest), k is Boltzmann's constant, T the temperature in units of Kelvin, and ε is a temperature dependent excitation energy described as that required to excite one $Er^{3+}$ ion from the $^4I_{15/2}$ ground state to the $^4I_{13/2}$ excited state at temperature T. The $^4I_{15/2}$ ground state and the $^4I_{13/2}$ excited state are the two electronic energy levels involved in the main laser transition of erbium at 1.54 μm. It can be seen in FIG. 4 that the highly doped phosphate laser glass containing erbium and ytterbium offers a high cross section for stimulated emission and can be expected to provide laser action in the band centered at 1.54 μm.

Figure 5:
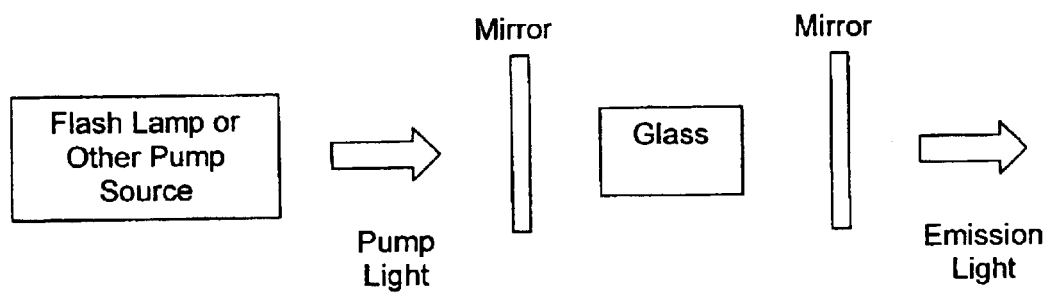
FIG. 5 shows a schematic representation of a laser system prepared with a highly doped phosphate glass.

A laser system of this invention can be constructed in a number of ways. FIG. 5 is a schematic drawing of a laser system prepared from a highly doped rare-earth phosphate laser glass prepared in the form of a solid rod or slab. In FIG. 5, the glass component is placed between two mirrors where one of the mirrors is transmissive to the pump source and the other mirror is partially transmissive to the output wavelength of the laser. Similar devices can be prepared by other technologies, for example the glass composition can be prepared by sputtering processes as a thin film or narrow waveguide, or the waveguide can be prepared directly in bulk glass by known structuring technologies such as ion exchange or direct writing with short pulse laser systems.

The preceding examples can be repeated with similar success by substituting the generically or specifically described reactants and/or operating conditions of this invention for those used in the preceding examples.

The entire disclosures of all applications, patents and publications, cited above or below, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A laser system comprising
an optical resonance cavity comprising a first totally reflective mirror, a second partially transmissive mirror, disposed within said optical resonance cavity, a phosphate glass laser medium and an optical pumping means operatively associated with said optical resonance cavity for exciting said glass laser medium to emit laser radiation,
the composition of said glass comprising
$P_2O_5$,
$Al_2O_3$,
one or more of $Na_2O$, $K_2O$, $Li_2O$, $Rb_2O$ or $Cs_2O$,
erbium and/or ytterbium dopant in an amount exceeding 8.5 mole % on an oxide basis,
a maximum of 4 weight percent of one or more of $SiO_2$, $As_2O_3$, $Sb_2O$, or $Nb_2O_5$, and optionally
one or more of MgO, CaO, SrO or BaO, and/or ZnO, and
wherein optionally up to 90% of the oxygen is replaced by fluorine in the glass.

2. A laser system according to claim 1, wherein the laser glass is doped by erbium in an amount exceeding 0.15 mole %.

3. A laser system according to claim 1, wherein the laser glass contains more than 5 mole % $Al_2O_3$.

4. A laser system according to claim 1, wherein the laser glass contains more than 8 mole % $Al_2O_3$.

5. A laser system according to claim 1, wherein the laser glass contains more than 60 mole % $P_2O_5$.

6. A laser system according to claim 1, wherein the laser glass contains more than 10 mole % $Al_2O_3$.

7. A laser system according to claim 1, wherein the laser glass contains more than 12 mole % $Al_2O_3$.

8. A laser system according to claim 1, wherein the laser glass contains more than 65 mole % of $P_2O_5$.

9. A laser system according to claim 1, wherein the laser glass contains more than 70 mole % of $P_2O_5$.

10. A laser system according to claim 1, wherein the laser glass contains more than 71 mole % of $P_2O_5$.

11. A laser system comprising
an optical resonance cavity comprising a first totally reflective mirror, a second partially transmissive mirror, disposed within said optical resonance cavity, a phosphate glass laser medium and an optical pumping means operatively associated with said optical resonance cavity for exciting said glass laser medium to emit laser radiation,
the composition of said glass comprising
$P_2O_5$,
$Al_2O_3$,
one or more of $Na_2O$, $K_2O$, $Li_2O$, $Rb_2O$ or $Cs_2O$,
erbium and/or ytterbium dopant in an amount exceeding 12 mole % on an oxide basis, a maximum of 4 weight percent of one or more of $SiO_2$, $As_2O_3$, $Sb_2O_3$ or and/or $Nb_2O_5$, and optionally
one or more of MgO, CaO, SrO or BaO, and/or ZnO, and
wherein optionally up to 90% of the oxygen is replaced by fluorine in the glass.

12. A laser system according to claim 11, wherein the laser glass contains more than 5 mole % $Al_2O_3$.

13. A laser system according to claim 11, wherein the laser glass contains more than 8 mole % $Al_2O_3$.

14. A laser system according to claim 11, wherein the laser glass contains more than 60 mole % of $P_2O_5$.

15. A laser system according to claim 11, wherein the laser glass is doped by erbium in an amount exceeding 0.15 mole %.

* * * * *